(12) United States Patent
Le Bastard et al.

(10) Patent No.: US 11,037,041 B2
(45) Date of Patent: Jun. 15, 2021

(54) IDENTIFICATION SENSOR FOR WORKS BURIED AT GREAT DEPTH

(71) Applicant: ELYDAN, St Etienne de Saint Geoirs (FR)

(72) Inventors: Ludovic Le Bastard, Saint-Egréve (FR); Thierry Nivon, Chatillon St Jean (FR); Marc Palomares, Grenoble (FR)

(73) Assignee: ELYDAN, Saint-Étienne-de-Saint-Geoirs (FR)

( * ) Notice: Subject to any disclaimer, the term of this patent is extended or adjusted under 35 U.S.C. 154(b) by 55 days.

(21) Appl. No.: 16/335,293

(22) PCT Filed: Sep. 22, 2017

(86) PCT No.: PCT/EP2017/074142
§ 371 (c)(1),
(2) Date: Oct. 16, 2019

(87) PCT Pub. No.: WO2018/055141
PCT Pub. Date: Mar. 29, 2018

(65) Prior Publication Data
US 2020/0265284 A1    Aug. 20, 2020

(30) Foreign Application Priority Data
Sep. 23, 2016  (FR) .................................... 16/01392

(51) Int. Cl.
G06K 19/00   (2006.01)
G06K 19/077  (2006.01)
G01V 3/12    (2006.01)

(52) U.S. Cl.
CPC ........... *G06K 19/0772* (2013.01); *G01V 3/12* (2013.01); *G06K 19/07773* (2013.01)

(58) Field of Classification Search
CPC . G06K 19/0772; G06K 19/07773; G01V 3/12
(Continued)

(56) References Cited

U.S. PATENT DOCUMENTS

2003/0231020 A1   12/2003  Yonezawa et al.
2006/0226955 A1*  10/2006  Murdoch ........... G06K 7/10009
                                                340/10.42
(Continued)

FOREIGN PATENT DOCUMENTS

WO    2011157941 A1   12/2011
WO    2011157942 A1   12/2011

OTHER PUBLICATIONS

International Search Report and Written Opinion in corresponding International Patent Application No. PCT/EP2017/074142 dated Jan. 16, 2018. 14 pages. (Translation attached.)

*Primary Examiner* — Karl D Frech
(74) *Attorney, Agent, or Firm* — Leason Ellis LLP

(57) ABSTRACT

A transponder for a RFID-type wireless communication and contactless identification system configured to be affixed to (or close to) structure intended to be buried, said transponder comprising:
  a set of antenna segments consisting of electrical wires constituting at least a first and a second antenna element (203-1, 203-2),
  a circuit board comprising a RFID chip and at least one tuning capacitance (202*x*) as well as coupling means (281) allowing the electrical coupling of said antenna segments;
characterized in that said antenna segments are arranged close to each other, at a distance of less than 3 mm and preferably less than 1 mm, so as to allow the appearance of coupling capacities (280) capable of widening the band of tolerance on the RFID resonance frequency.

11 Claims, 11 Drawing Sheets

(58) Field of Classification Search
USPC .................................. 235/492, 487; 343/867
See application file for complete search history.

(56) References Cited

U.S. PATENT DOCUMENTS

2013/0002512 A1\* 1/2013 Leighton ................ G01S 1/245
                                                                                  343/867
2013/0271343 A1\* 10/2013 Thomas .................. H01Q 7/00
                                                                                   343/867

\* cited by examiner

IDENTIFICATION SENSOR FOR WORKS BURIED AT GREAT DEPTH

CROSS-REFERENCE TO RELATED PATENT APPLICATIONS

This application is a U.S. National Stage Application under 35 U.S.C. § 371 of International Patent Application No. PCT/EP2017/074142, filed Sep. 22, 2017, which claims the benefit of priority of French Patent Application number 16/01392 filed Sep. 23, 2016, both of which are incorporated by reference in their entireties. The International Application was published on Mar. 29, 2018, as International Publication No. WO 2018/055141 A1.

TECHNICAL FIELD OF THE INVENTION

The present invention relates to the field of RFID identification sensors dedicated to buried structures, and in particular a RFID identification sensor which is adapted to great depths.

STATE OF THE ART

The multiplication of infrastructures and networks allowing the distribution of water, gas, electricity, telecommunications has become evident today. Safety, regulatory or legislative constraints make it necessary to be able to precisely locate these buried structures. The interest of proceeding to a detection and/or an identification of these elements is obvious and first techniques have been developed to allow a detection or a RFID type identification (Radio Frequency Identification) of the buried structures.

International patent application WO 2011157941 filed on Jun. 14, 2011 by COMMISSARIAT A L'ENERGIE ATOMATIQUE ET AUX ENERGIES ALTERNATIVES, has for object a wet antenna which can be used for the realization of a detector/RFID transponder RFID for a buried work. The teaching of this application is a first significant step towards the problem of tolerance vis-à-vis the external environment.

The operation of this known antenna is illustrated in FIG. 9: a set of loops (300t, 300d) is printed on a thin substrate. The top loops (300t) are facing the bottom loops (300d). The arrangement achieved causes a distributed capacitance (380) which shows to be quite significant, due to the short distance between the loops facing each other. It is this capacitance that serves as a tuning capability for the antenna, while the antenna segments (300t, 300d) constitute the inductor. The implementation of Moebius loops and the distributed capacitance (380) allow a relative immunity to variations due to the external environment.

However, the process remains very sensitive to the manufacturing process. In fact, the distributed capacitance is a function of three direct parameters: the width of each segment (300t) and (300d), the thickness of the substrate between each segment (300t) and (300d), and the alignment of these segments between them. Finally, a fourth—indirect—parameter is the value of the permittivity of said substrate, which can vary depending on the moisture content and the temperature.

Then, regarding the manufacturing costs, the process which is implemented entails a mandatory presence of a substrate, which must be printed with metal tracks in double face.

For its part, the applicant of the present patent application filed a patent application WO 2012/062471 which is intended to cover a polymer tube fitted with an identification sensor or RFID tag.

Generally speaking, one should recall that the wireless communication and contactless identification technology, referred to as RFID, relates more particularly to the HF field of technology (13.56 MHz in our example) for which communication is essentially based on a magnetic field. In this frequency range the reading distances are generally less than 1 meter. The system then consists of a transmitter (active part, which is power generator) and a transponder (passive part, wirelessly receiving electric power).

As illustrated respectively in FIGS. 1 and 2, an RFID transponder conventionally comprises, serially connected (FIG. 1) or parallel connected (FIG. 2) at least three elements being an antenna (100), an RFID chip (101) and a capacitor (102).

The antenna (100) consists of one or more loops intended to collect a portion of the electromagnetic emission power generated by a RFID transmitter located on the ground. In this regard, the antenna has a minimum area for allowing an activation of the RFID chip. Practically, this surface corresponds to the sensing by the receiver of a minimum electromagnetic power in relation to the maximum electric power being transmitted, the detection distance and the power requirements of the RFID chip. The number of loops will be determined in relation to the minimum activation voltage of the RFID chip.

The antenna has an inductor designated $L_{ant}$. This inductance value is a function of a geometry of the antenna. By way of example, an approximation for a circular antenna composed of N contiguous or superimposed loops, having a radius R and a wire diameter a is the following:

$$L = \mu_0 * R * N^2 * \left(\ln\left(\frac{8*R}{a}\right) - 2\right) \text{ avec } \mu_0 = 4\pi * 10^{-7}$$

With ln being the neperian logarithm.

The RFID chip can be likened to a capacitor marked $C_{tag}$. An illustrative value is of the order of 20 pF ($20*10^{-12}$ F).

The arrangement has to resonate at a frequency close to the signal frequency, and as known to a skilled man, the equation determining the resonant frequency is:

$$f_0 = \frac{1}{2\pi\sqrt{L_{ant} * C_{acc}}} \text{ with } C_{acc} = C_{102} + C_{tag}$$

for figure 1(parallel coupling) or $$C_{acc} = \frac{C_{102} * C_{tag}}{C_{102} + C_{tag}}$$

for FIG. 2 (serial coupling). $C_{acc}$ corresponds to the tuning capacity of the resonant system.

If $L_{ant}$ is set by the geometry of the antenna, $f_0$ is set by the system, and there only remains $C_{acc}$ to be used as an adjusting parameter. This value is given by the well known formula:

$$C_{acc} = \frac{1}{4\pi^2 * f_0^2 * L_{ant}}$$

Other techniques may be used, as illustrated in FIGS. 3 and 4, where one sees that the RFID chip 101 is isolated from the resonant circuit by means of a coupler 103.

Moreover, it should be noted that, in order to mitigate the effects of frequency drift (drift of the component values due to temperature variations or dispersion due to tolerance, or to the environments in which transponders are arranged), the conventional designs entails the use of a relatively low quality factor (generally of the order of 30 to 40). However, the more the surface of the antenna surface and/or the number of loops increases, the more $L_{ant}$ increases, the quality factor being proportional to $L_{ant}$, the latter increases so, until becoming problematic.

Presentation of the New Problem Encountered Related to the Mass Industrialization of RFID Tags.

As mentioned above, the implementation of an RFID tag for a buried structure required to have a RFID label being insensitive to the moist environment, which problem was significantly solved by the aforementioned patent application WO2011157941.

However, a new problem seems crucial for the manufacturer considering the mass production of RFID tags for buried works. Indeed, when $L_{ant}$ increases (ie increase of the surface or increase of the number of loops), one observe that $C_{acc}$ has to diminish so as to maintain the circuit resonant at frequency $f_0$. If, for one given implementation, on has $L_{ant}$=11 µH (11*10$^{-6}$ H), with, for instance, $f_0$=13.56 MHz (13.56*10$^6$ Hz), then $C_{acc}$=12.52 pF.

On then sees that it is practically impossible to make a circuit with paralleling of the components, as illustrated in FIG. 1. There only remains the possibility of serialization that is shown in FIG. 2, what requires, in accordance with formulas which are well known to a skilled man, $C_{102}$=33.5 pF, bus in doing so, and still in accordance with well-known formulas, we impose a voltage divider bridge formed by $C_{tag}$, $C_{102}$. Which, in our example, introduces a voltage drop at the terminals of 101 of the order of a third, then decreasing the detection capacity of the transponder.

The use of the coupling method illustrated in FIGS. 3 and 4, as described, for example in US patent 2009/0027208 filed on Jul. 5, 2006 by TAGSYS, could improve the situation but proves relatively costly for mass industrialization, either when considering the components required (i.e. one additional coupler required) or from the manufacturing point of view for the positioning of a pre-chip fitted with a coupling element. In addition, the overall efficiency of the transponder is reduced by the presence of the coupler, due to the intrinsic efficiency of the latter.

Furthermore, it has been found that none of the known solutions, and in particular the aforementioned solution described in the above-mentioned patent application WO2011157941, makes it possible to guarantee a good tolerance on the tuning frequency.

It can be seen that this frequency $f_0$ will depend on three distinct direct parameters: the manufacturing process of the loops (100, 200x) (influence on the value of the inductance), the tolerance on the tuning capacitors (102, 202x), and finally the tolerances on parasitic capacitances (280x, capacity of 201). A fourth parameter, indirectly, is the operating temperature which will a drift on the different values— essentially the capacities—compared to a nominal temperature (typically 25° C.).

For variations due to temperatures, measurements have been taken, and are illustrated in FIG. 8b, and it is observed that the frequency offset is of the order of 140 Khz over the range 0-40° C. If tolerances on the component values are taken into account, for example a variation of 2% on the nominal value of the tuning capacitance causes a variation of 130 kHz on the resonance frequency.

In conclusion, without taking into account other influences (due to the environment in particular), one has a minimum of 270 kHz of possible variation on the resonance frequency.

SUMMARY OF THE INVENTION

It is a first objection of the present invention to provide a detection device for a RFID chip being buried at great depth—up to at least three meters—for detection and identification of a buried structure.

It is another object of the present invention to provide a detection device, or transponder, for detecting a RFID chip, which has a high quality factor (of the order of 100) while allowing a large tolerance on the resonance frequency, for example allowing a drift of about 400 kHz.

It is a third object of the present invention to provide a transponder having a low manufacturing cost, which provides a better energy efficiency compared to other known solutions.

It is a fourth object of the present invention to provide a transponder for an RFID tag adapted to a structure intended to be buried, which comprises all the components ensuring the reception of the signal, the retransmission of a response signal, the tuning on the frequency, as well as a signal processing performed by a RFID chip, while allowing a minimum of 270 kHz of possible variation on the resonant frequency.

It is a fifth object of the present invention to improve the process of manufacturing an RFID tag, in the sense that, by allowing greater tolerance on the tuning frequency, a realization is achieved which allows a more great flexibility, both on the components (nominal value of the components, . . . ) and on the implementation of the conductors (layout, nature of the insulators, . . . ), but also in the range of climatic conditions allowed since the RFID tag must remain functional in the temperature range 0-40° C.

All those objects are achieved by the invention which provides a transponder for a RFID-type wireless communication and contactless identification system, configured to be affixed to a buried polymeric conduit, said transponder comprising:

- a set of antenna segments consisting of electrical conductors constituting at least a first and a second antenna element (203-1, 203-2),
- a printed circuit comprising an RFID chip having at least one tuning capacitance 202x as well as a connector 281 allowing the electrical connection of said antenna segments;
- characterized in that said antenna segments are arranged close to each other, at a distance of less than 3 mm and preferably less than 1 mm, so as to allow the appearance of coupling capacitors capable of widening the band of tolerance on the RFID resonance frequency.

In a particular embodiment, the antenna segments are arranged in a same plane, concentrically, and electrically connected to the connector, wherein two immediately adjacent antenna segments are arranged at a distance of less than 3 mm, and preferably 1 mm allowing the appearance of coupling capacitors capable of widening the tolerance band on the RFID resonance frequency.

In another particular embodiment, the antenna segments have planes superimposed on each other, wherein two immediately adjacent antenna segments are located at a distance of less than 3 mm and preferably less than 1 mm allowing the appearance of coupling capacitors capable of widening the tolerance band on the RFID resonance frequency.

Preferably, the antenna segments are arranged together so as to form a twist allowing the appearance of coupling capabilities allowing the widening of the tolerance band on the RFID resonance frequency.

Preferably, the antenna segments are grouped by two or three in the same conductive wire with two or three conductors, in order to show a linear capacitance between each of the antenna segments having a value between 50 and 75 pF/m.

Therefore, it appears no longer necessary, as was the case with the solution recommended in the aforementioned patent application WO 2011157941 to use an explicit substrate to produce the antenna elements, the distributed capacitance appearing between the antenna segments playing only a relative role in the final tuning of the antenna, which is determined by the series capacities. Furthermore, it is no longer necessary to provide a symmetry and the manufacturing process of the label is reduced to a simpler and more advantageous, with a minimal manufacturing cost.

DESCRIPTION OF THE DRAWINGS

Other characteristics, objects and advantages of the invention will appear on reading the description and the drawings below, given solely by way of non-limiting examples. In the accompanying drawings:

FIG. 8a illustrates the maximum reading distance vs. frequency curves for embodiments M1 and M2.

FIG. 8c illustrates the maximum reading distance vs frequency curve for embodiment M4.

FIG. 8d illustrates the maximum reading distance vs frequency curve for embodiment M3.

DESCRIPTION OF A PREFERRED EMBODIMENT

We will now consider a particular embodiment of an RFID transponder for carrying out a RFID tag for a pipe or pipe which is intended to be buried underground. For instance, one may consider a High Density Polyethylene pipe, specifically designed for the construction of a pipeline for the supply of drinking water, the distribution of gas, the purification, the protection of electrical cable and optical fiber.

In particular, it is possible to consider the example of a polyethylene multilayer pipe designed to realize an network of pipes under pressure and buried underground, consisting of a PE80 or PE100 high density polyethylene tube according to the EN1555 standard. More specifically, the RFID tag will be used providing information representative of the tube identification, the tube manufacturing process and also the tube location.

Figure 1:
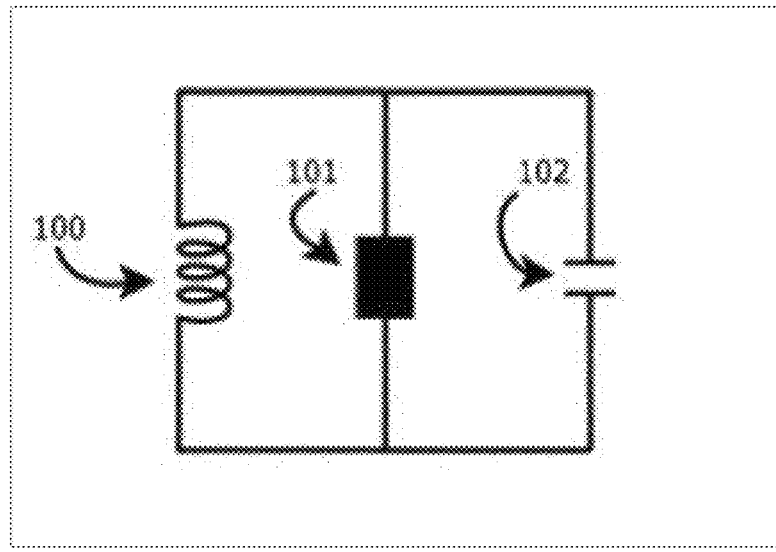
FIG. 1 illustrates the conventional structure of a RFID transponder based on the parallel connection of an antenna, an RFID chip and a capacitor.
Figure 2:
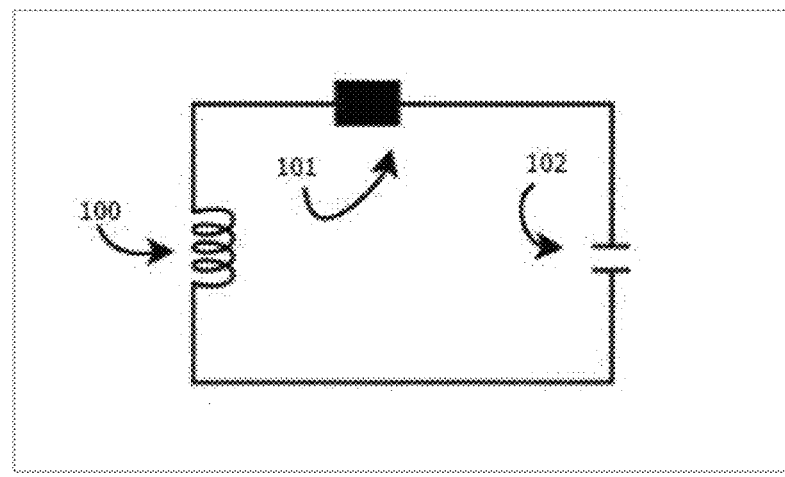
FIG. 2 illustrates the conventional structure of an RFID transponder based on the serial connection of an antenna, an RFID chip and a capacitor.
Figure 3:
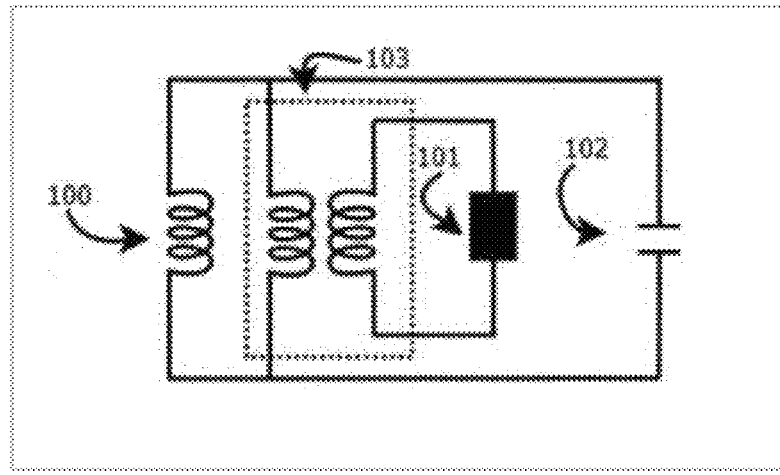
FIGS. 3 and 4 illustrate two variants of a known architecture of an RFID transponder comprising a coupler 103 for connecting the RFID chip to the resonant element.
Figure 4:
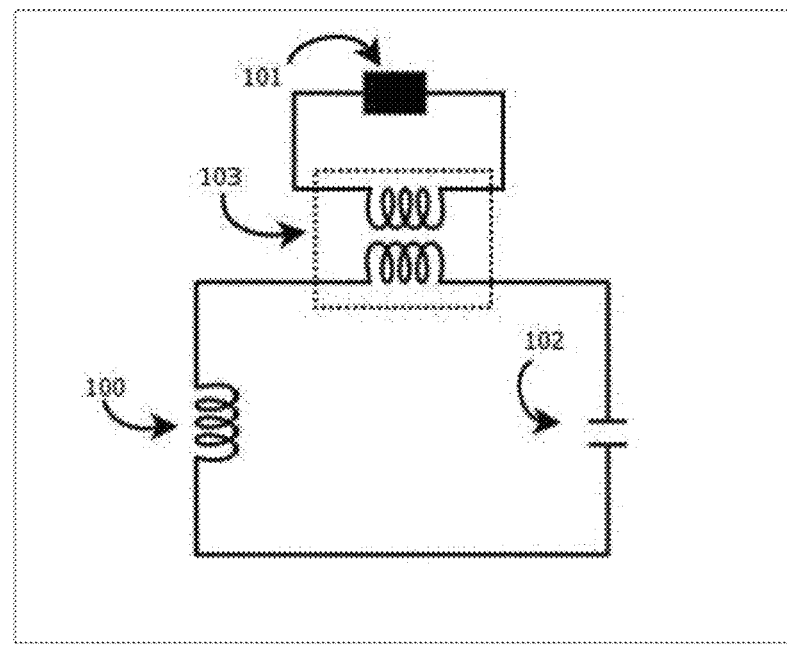
Figure 5:
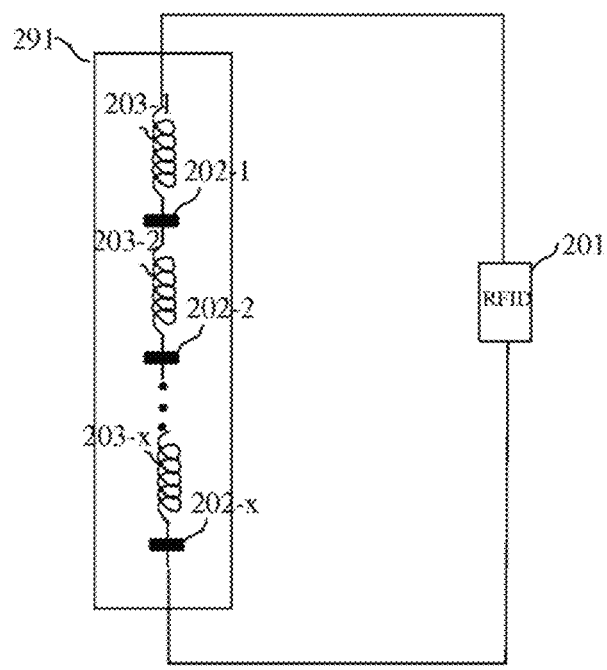
FIG. 5 illustrates the electrical diagram of an embodiment of an RFID transponder comprising an RFID chip and a plurality of antenna elements.

As shown in FIG. 5, illustrating the electrical diagram of one embodiment according to the invention, the RFID transponder consists of a resonant system, which comprises an antenna 291, consisting of a serial connection of antenna elements 203-1, 203-2, . . . 203-$x$, capacitors 202-1, 202-2 . . . 202-$x$, wire in series with a conventional RFID chip 201. The RFID chip is an integrated circuit adapted for the implementation of wireless communication and contactless identification techniques referred to as Radio Frequency Identification Detection (RFID), which is well known to a person skilled in the art and, for the sake of conciseness, will not be described further.

In the embodiment illustrated in FIG. 5, each end of an antenna element is connected to either a capacitor 202-1, 202-2, . . . 202-$x$, or to an electrode of the RFID chip 201.

In general, each antenna element is composed of one or more individualized electrical conductive wires—or antenna segments designated by the generic reference 200$x$ (not shown in FIG. 5), each of which consists of at least one significant fraction of a loop, constituting the sensing element. A first antenna segment may be, for example, consisting of a half-loop. A second antenna segment may consist of a whole loop. A third antenna segment may consist of a loop and a half. A fourth of two loops etc.

Thus, the antenna elements 203-1, . . . 203-$x$ can achieve a variety of configurations, based on multiple combinations of antenna segments 200$x$.

In general, each antenna segment 200$x$ consists of an electrical wire, insulated or not, arranged within a multistrand or single-stranded cable. The wire section may vary. Each antenna segment 200$x$ may differ from one another within a same embodiment, both by the geometry and also by the number of loops, thus allowing great possibilities of different configurations for the RFID tag.

With regard to the capacitors 202-1, 202-2, . . . 202-$x$ shown in FIG. 5, it should be noted that these can take very different forms. In particular, a capacity 202-$x$ is not necessarily restricted to a single element, but can be conceived as a serialization and/or parallelization of several individual capacities, forming according to the rules of art the equivalent of a unique ability. In the same way, it will be noted that the capacities 202-1, 202-2, 202-x may be of different value.

Figure 6A:
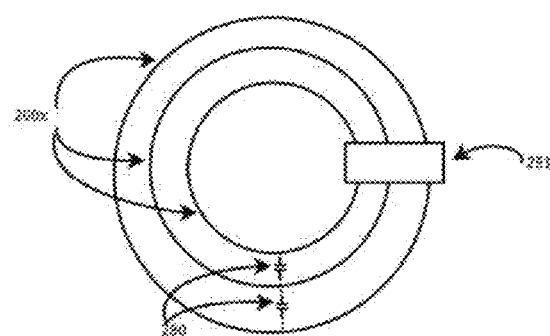
FIG. 6a shows an embodiment of a first topology of antenna segments that are concentrically arranged.
Figure 6B:
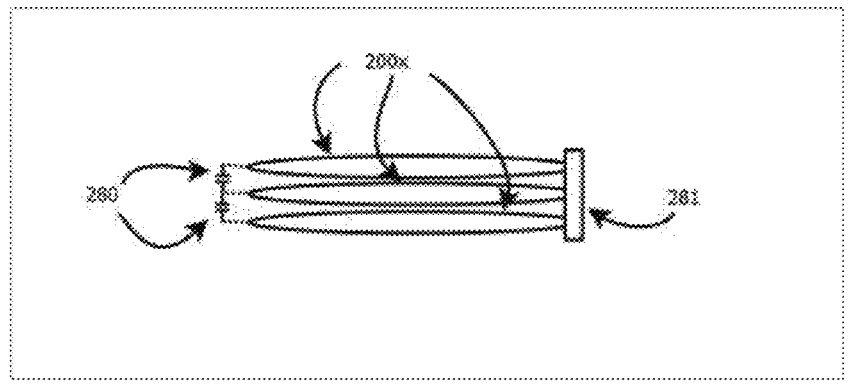
FIG. 6b shows an embodiment of a second topology consisting of a superposition of the different antenna segments along an axis perpendicular to the surface of the different antenna segments.
Figure 6C:
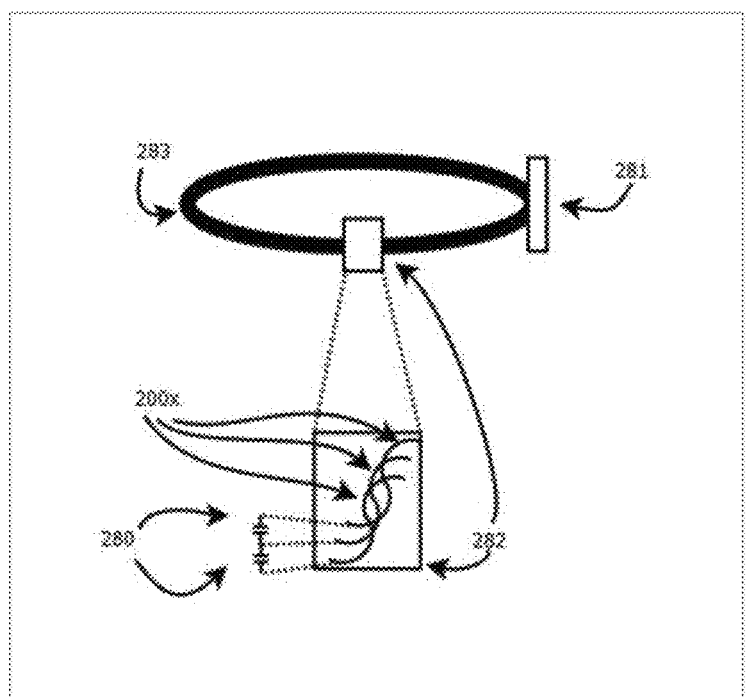
FIG. 6c shows an embodiment of a third topology consisting in twisting together the different antenna segments so as to form a twist

The antenna segments 200x composing the antenna elements 203-1, 203-x may be arranged on a support according to different embodiments, as illustrated in FIGS. 6a, 6b and 6c.

More specifically, FIG. 6a illustrates a first layout topology of the antenna segments 200x which is based on a concentric arrangement of three antenna segments 200x being electrically connected to a printed circuit board 281. In this configuration, the three antenna segments have a circular shape, arranged in the same plane, and are arranged very closely. Two immediately adjacent antenna segments are located at a distance of less than 3 mm and preferably 1 mm to allow the occurrence of coupling capacitance 280 illustrated in FIG. 6a.

A second topology is illustrated in FIG. 6b where one sees the superposition of different antenna segments—e.g. three antenna segments—along an axis perpendicular to the surface of those antenna segments. As previously, the three antenna segments, are electrically coupled to the printed circuit or connector 281, and are arranged very closely, preferably at a distance of less than 1 mm, to show an appearance of coupling capacitors also represented in the FIG. 6b, by the reference 280.

Finally, FIG. 6c illustrates a third topology wherein the different antenna segments 200x constituting the antenna elements 203-1 . . . 203-x are twisted together to form a twist 282 which may be overmolded to form a single sheath 283 coupled to a printed circuit or connector 281. In this configuration, it is the fact of twisting the various antenna segments constituting the antenna elements that makes it possible to show an appearance of coupling capacitors whose interest will appear, with force, in the description below.

The topologies illustrated in FIGS. 6a, 6b and 6c are only illustrative examples of the multiple possibilities of arrangements which may be considered for carrying out a RFID tag according to the present invention. In general, a person skilled in the art will be able to design a combination of the various topologies illustrated above, such as for example, two distinct groups of antenna segments of 3 loops, each made according to the topology of FIG. 6c, and the two groups being by the assembled sequence following the topology of FIG. 6b.

Clearly, there is no limit to the possibilities of combining the different topologies illustrated.

Referring now to FIGS. 7a, 7b, 7c and 7d, there will now be more particularly described the connector 281 which allows the electrical coupling of the antenna segments to the oscillating element of the RFID transponder.

Generally speaking, connector 281 is configured so as to allow the electrical coupling of the different antenna segments to each other, but also to the capacitors 202-1, 202-2, . . . 202x, as well as to the RFID chip 201, so as to implement the resonant element whose electrical diagram is shown in FIG. 5.

In its simplest form, the connector may be in the form of an integrated circuit on which is located RFID chip 201, as well as the different capacitors 202-1, 202-2, . . . 202x.

For the sake of simplicity, in the embodiments shown in FIGS. 7a-7d, there is provided one single capacitor 202x associated with a RFID chip, so that FIGS. 7a-7d represent, in accordance with the diagram illustrated in FIG. 5, a arrangement of two antenna elements (two disconnections in the serial connection, a first one for the RFID chip and a second one for capacitor 202x).

The different antenna segments are electrically coupled via electrodes 284 and 285, which may be any number.

Figure 7A:
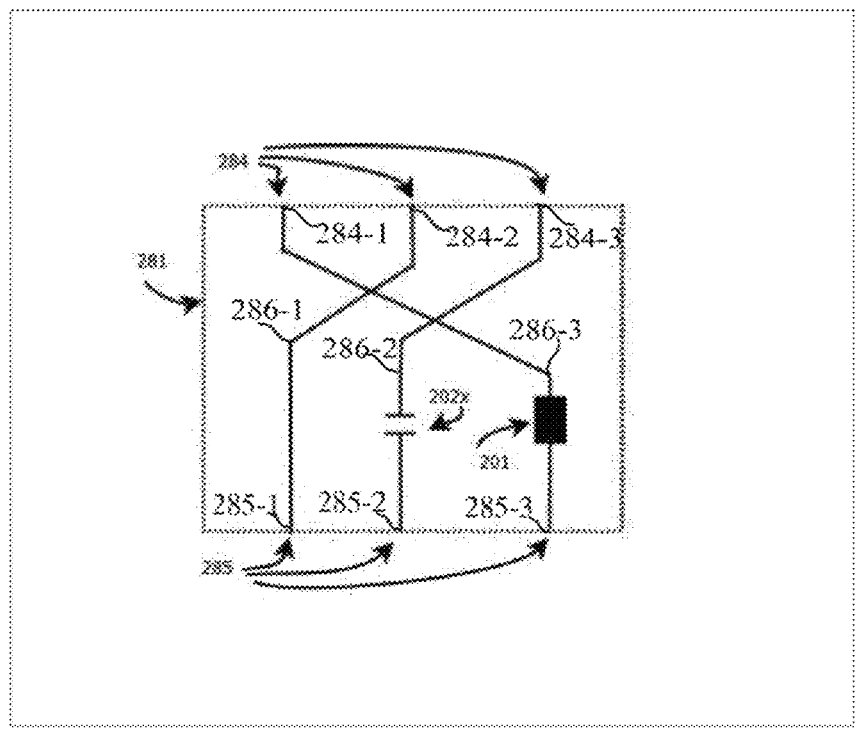
FIG. 7a illustrates a first embodiment of a printed circuit comprising two antenna elements consisting of three antenna segments.

For example, connector 281 of FIG. 7a takes the form of a printed circuit comprising a set of three input electrodes, respectively 284-1, 284-2, 284-3, and three output electrodes, 285-1, 285-2 and 285-3, for the respective coupling of three antenna segments 701, 702, 703 constituting the antenna 291.

The Circuit Board/Connector Comprises:
  a first input electrode 284-1, a second input electrode 284-2 and a third input electrode 284-3 which allow the coupling of a first end of first segment 701, a first end of second segment 702 and a first end of third antenna segment 703, respectively;
  a fourth output electrode 285-1, a fifth output electrode 285-2 and a sixth output electrode 285-3 which allow the coupling of a second end of first antenna segment 701, a second end of second antenna segment 702 and a second end of third antenna segment 703, respectively.

The Printed Circuit further Comprises:
  a first circuit 286-3 for connecting the first input electrode 284-1 to the sixth output electrode 285-3 via an RFID chip;
  a second circuit 286-1 for connecting the second input electrode 284-2 to the fourth output electrode 285-1;
  a third circuit 286-2 for connecting the third input electrode 284-3 to the fifth output electrode 285-2 via the capacitor 202x.

Figure 7B:
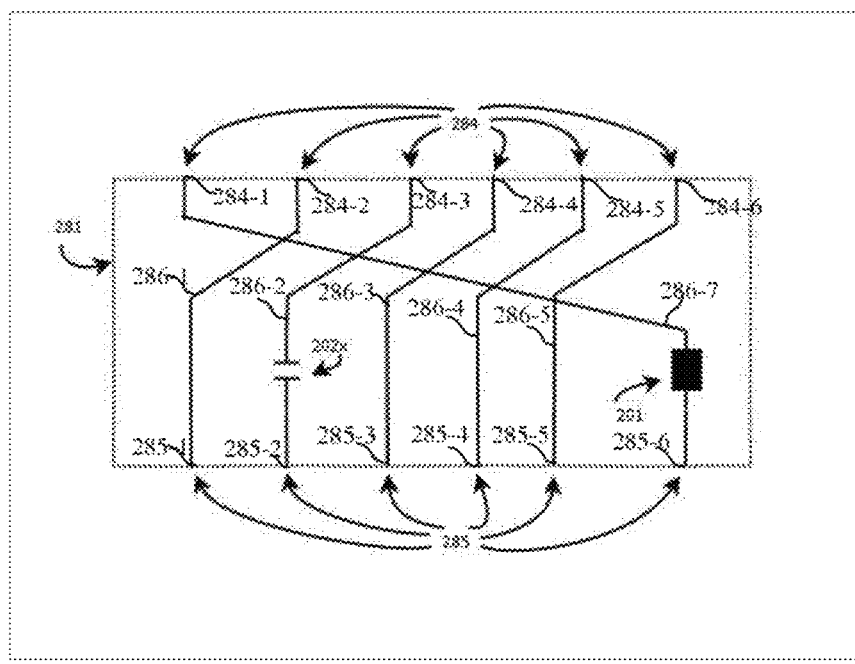
FIG. 7b illustrates a second embodiment of a printed circuit also having two antenna elements consisting of six antenna segments.
Figure 7C:
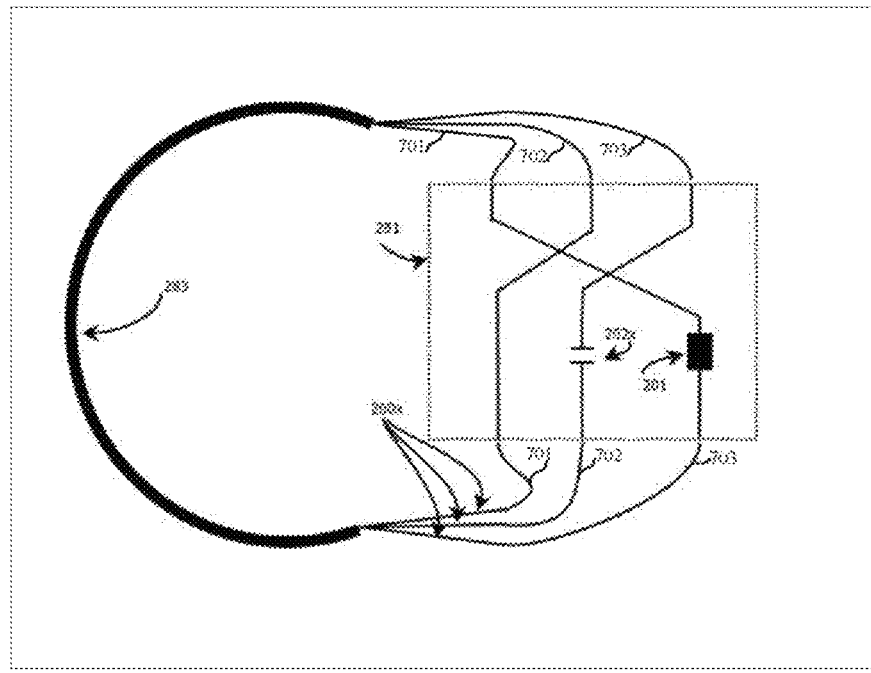
FIG. 7c illustrates the connection of the first embodiment of the connector of FIG. 7a in which the three antenna segments are made by means of a single tri-conductor cable.

In a preferred embodiment which is illustrated in the diagram of FIG. 7c, the first, second and third antenna segments 701, 702, 703 are integrated within the same three-conductor electric cable making it possible to generate a capacitance distributed between said antenna segments.

Referring to FIG. 7b, there will now be described a second embodiment of a printed circuit having a connector 281 configured for the coupling of six antenna segments 801, 802, 803, 804, 805 and 806.

More specifically, the printed circuit comprises a first input electrode 284-1, a second input electrode 284-2, a third input electrode 284-3, a fourth input electrode 284-4, a fifth electrode 284-5 input and a sixth input electrode 284-6 for connecting a first end of a first antenna segment 801, a first end of a second antenna segment 802, a first end of a third antenna segment 803, a first end of a fourth antenna segment 804, a first end of a fifth antenna segment 805 and a first end of a sixth antenna segment 806, respectively.

The printed circuit further comprises a seventh output electrode 285-1, an eighth output electrode 285-2, a ninth output electrode 285-3, a tenth output electrode 285-4, an eleventh output electrode 285-5 and a twelfth output electrode 285-6 for respectively connecting a second end of the first antenna segment 801, a second end of second antenna segment 802, a second end of third antenna segment 803, a second end of fourth antenna segment 804, a second end of fifth antenna segment 805 and a second end of sixth antenna segment 806.

The Printed Circuit of FIG. 7b Comprises:
  a first circuit 286-7 for connecting the first input electrode 284-1 to the twelfth output electrode 285-6 via a RFID chip;
  a second circuit 286-1 for connecting the second input electrode 284-2 to the seventh output electrode 285-1;

a third circuit 286-2 for connecting the third input electrode 284-3 to the eighth output electrode 285-2 via the capacitor 202x;

a fourth circuit 286-3 for connecting the fourth input electrode 284-4 to the ninth output electrode 285-3;

a fifth circuit 286-4 for connecting the fifth input electrode 284-5 to the tenth output electrode 285-4;

a sixth circuit 286-5 allowing the connection of the sixth input electrode 284-6 to the eleventh output electrode 285-5.

Figure 7D:
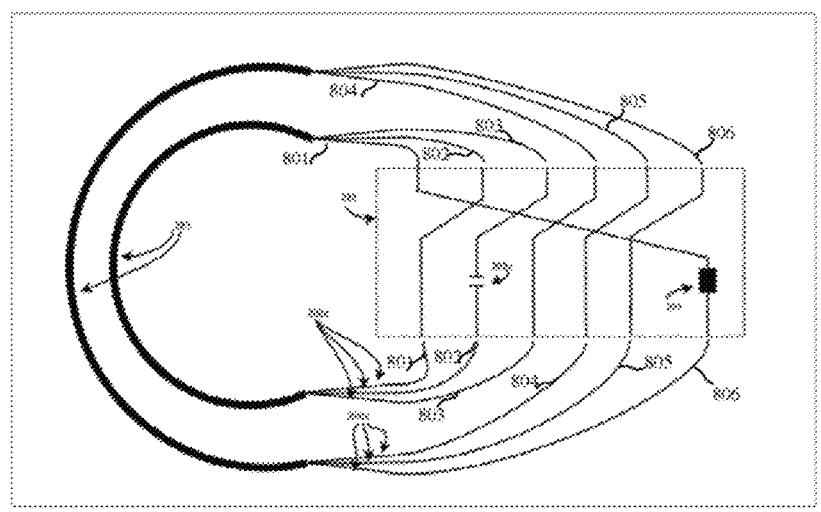
FIG. 7d illustrates the connection of the second embodiment of the connector of FIG. 7b in which the six antenna segments are made by means of tri-conductor cables.

Preferably, the first, second and third antenna segments 801, 802 and 803 are integrated within a first three-conductor electrical cable and the fourth, fifth and sixth antenna segments 804, 805 and 806 are integrated in within a second three-conductor electrical cable, as illustrated in the embodiment of FIG. 7d.

The arrangement of the antenna segments (200x) implemented in one of the embodiments (FIGS. 6a, 6b and 6c), or any combination thereof, causes a capacitive coupling (280) to occur between each conductor (antenna segment) (200x), more or less important according to the embodiments. The distributed capacitors (280) are created either naturally by the proximity of electrical wires, or by the effective implementation of capacitors. Moreover, the presence of an outer envelope (overmoulding) (283) can further increase the value of the distributed capacitance. It is this capacitive coupling which ensures a rather strong immunity to the dispersion stresses, as well as to the dispersive influences of the external environments.

The structure of the antennas is determined so that the wires are spaced from 1 to 3 mm. In one embodiment, the wires are overmoulded 3 by 3 strands, with a component having $\epsilon_r \cong 5$. This gives a linear capacitance (280) between the three wires, when considered two by two, of between 50 and 75 pF/m.

Operation and Adaptation of the Resonance Frequency, Resistance to Tolerances and Variations The plurality of antenna segments 200x forms the sensing surface. This surface must be sufficient to meet the power supply requirement of RFID chip 201. The total number of loops resulting from the plurality of antenna segments is such that the voltage across RFID chip 201 is sufficient to activate it.

The frequency tuning is the result, firstly, of the serialization of the inductance of the global antenna (plurality of 200x) and also the plurality of capacitors 202x when coupled in series.

However, the distributed capacitors 280, although having a small impact on the resonance frequency, nevertheless play a role in the calculation of the tuning capacity.

But the true role of these distributed capacitors 280 is, on one hand, to attenuate the influence of the parasitic capacitances introduced by the external environment, and, on the other hand, to allow a widening of the tolerance on the tuning frequency as evidenced by the tests which were performed.

On some examples of realization, we will look at which tuning frequency range one can obtain a decrease of less than 10 cm of the maximum detection distance with respect to the maximum distance expected. One experiment relates to the embodiment made according to the teaching of the aforementioned patent applications WO2011157941 and US 2009/0027208; another test relates to an embodiment (M1) being closer to the present invention, but whose gap between the loops is voluntarily set to a larger value than recommended (10 mm), while two other embodiments (M2, M3) relate to the invention.

DESCRIPTION OF TEST ACHIEVEMENTS

Tag M1: the embodiment is closed to the schematics of FIG. 7c, but with an inter loop of 10 mm (thus with a very low distributed capacity), for a surface of 702 cm2.
With the implementation M1, we have:
$f_{M1,min}$=13.530 MHz and $f_{M1,max}$=13.740 MHz, thus $\Delta_{M1}$=210 kHz Tag M2: this embodiment is in accordance with FIG. 7c, based on a three-wire cable, for a surface of 702 cm², one obtains:
$f_{M2,min}$=13.495 MHz and $f_{M2,max}$=13.825 MHz, thus $\Delta_{M2}$=330 kHz This represents a 50% improvement in the tolerance band between M1 and M2.

Tag M4: Embodiment according to the teaching of the above-mentioned patent applications WO2011157941 and US 2009/0027208, for a surface area of 132 cm².

Figure 8A:
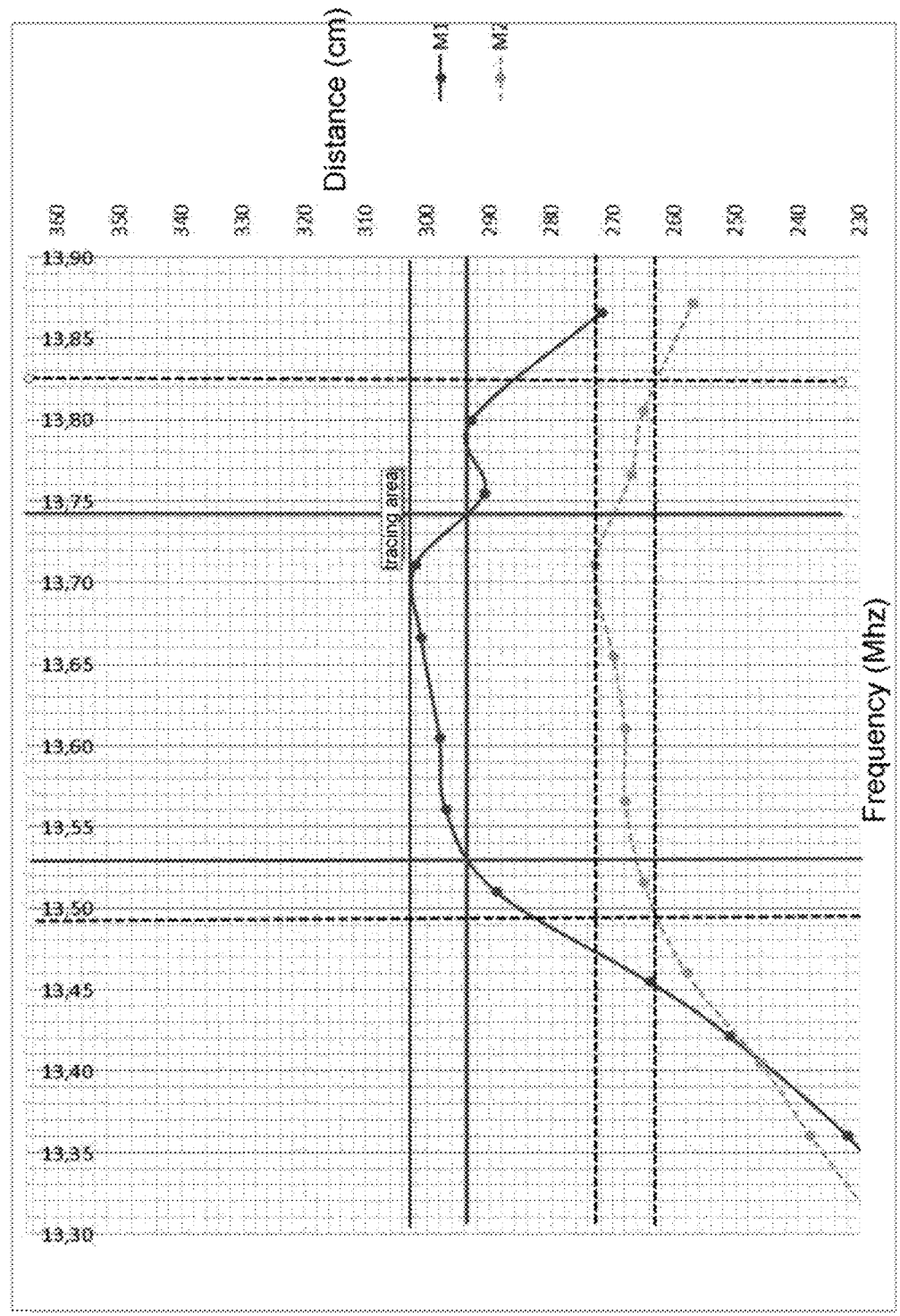
FIGS. 8a, 8c, 8d show the tolerance on the tuning frequency, resulting in a difference of less than 10 cm over the maximum detection distance
Figure 8B:
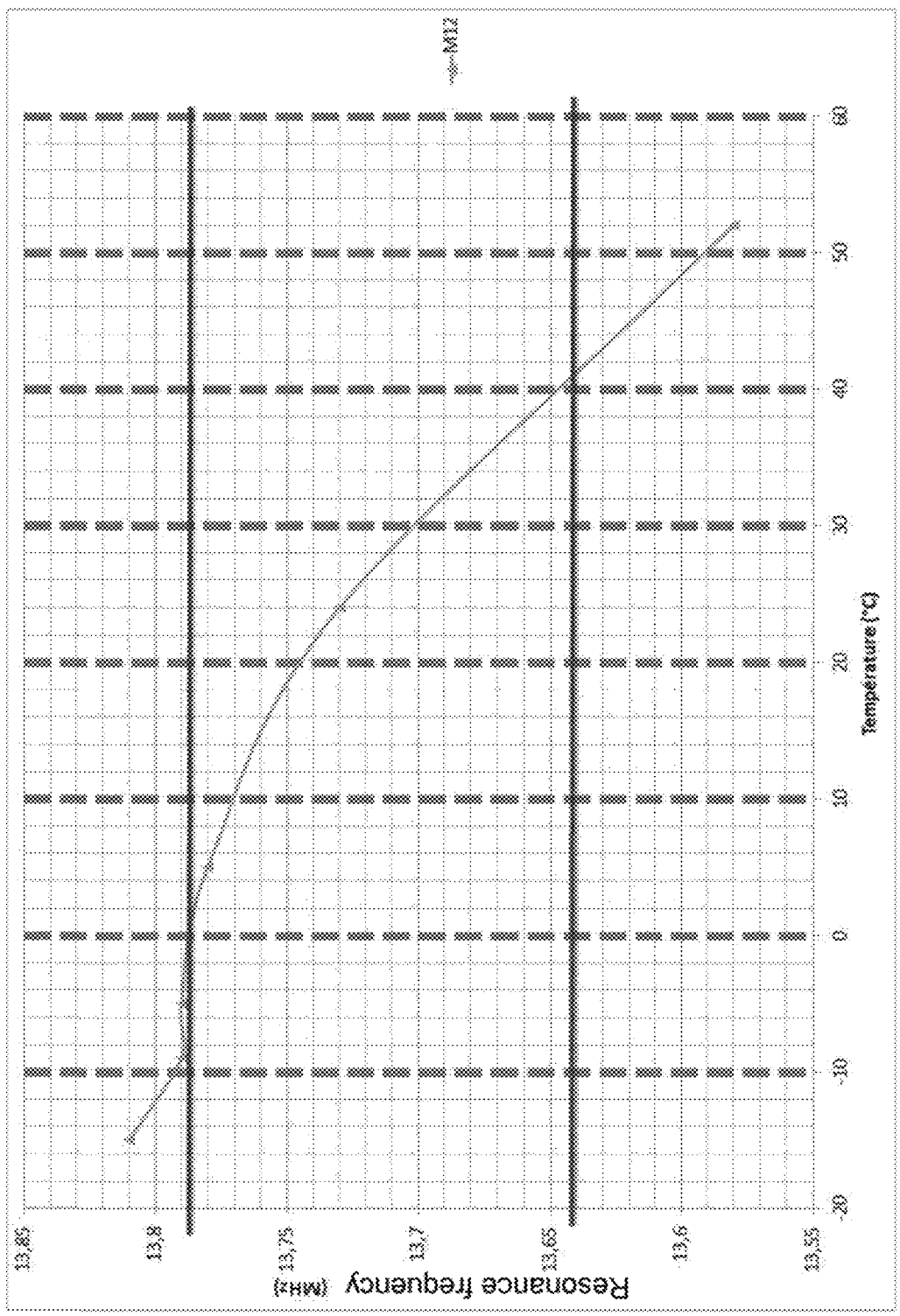
FIG. 8b illustrates measurements of frequency offsets as a function of temperature variations.
Figure 8C:
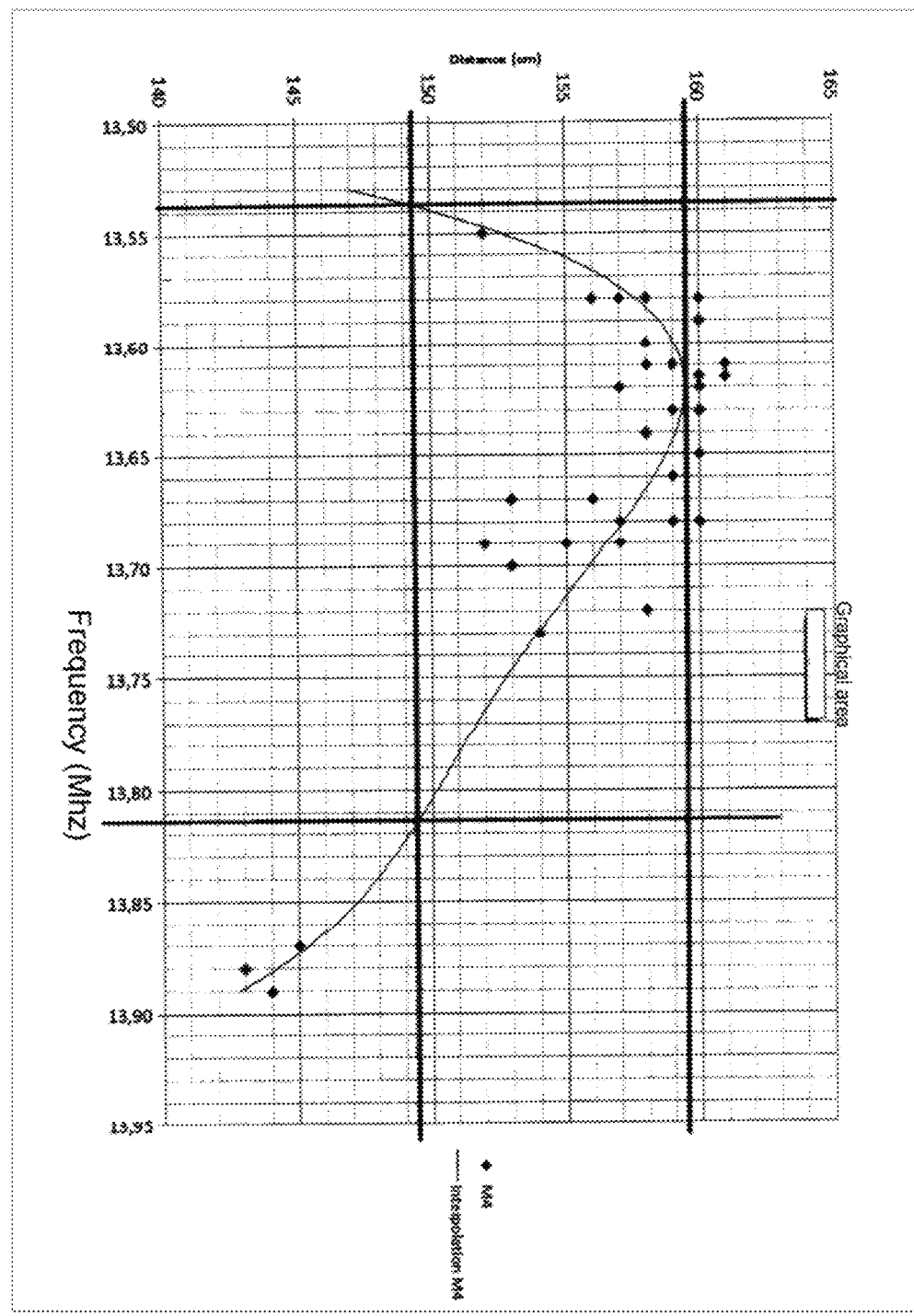

An estimate of the width of the tolerance band was made (FIG. 8c), and the estimate is obtained:
$f_{M4,min}$=13.535 MHz and $f_{M4,max}$=13.810 MHz, thus $\Delta_{M4}$=275 kHz Tag M3: this embodiment complies with FIG. 7d, composed of two cables comprising each three wires, thus forming a total of two groups of three loops, for a surface being 63 cm².

Figure 8D:
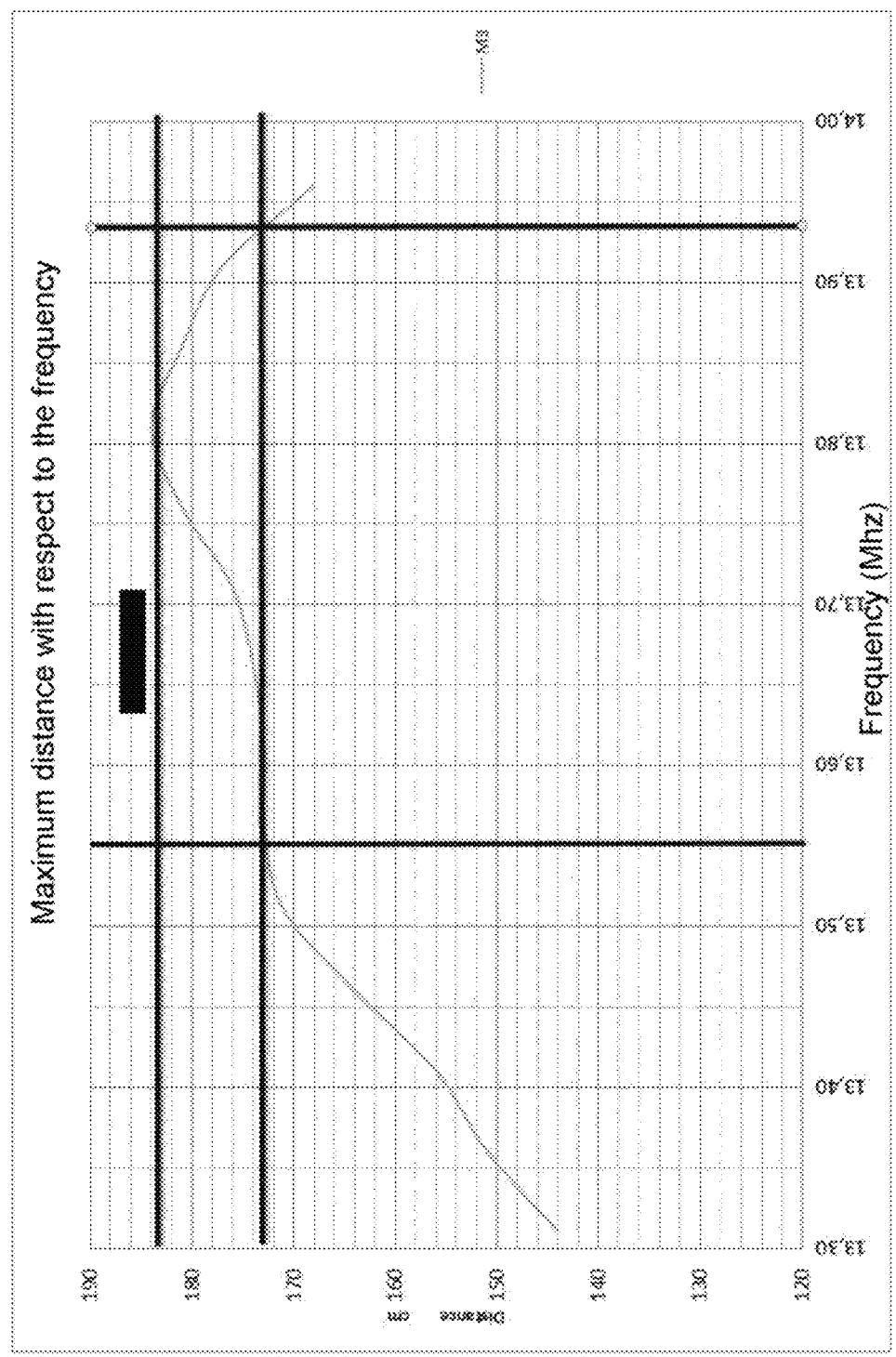
Figure 9:
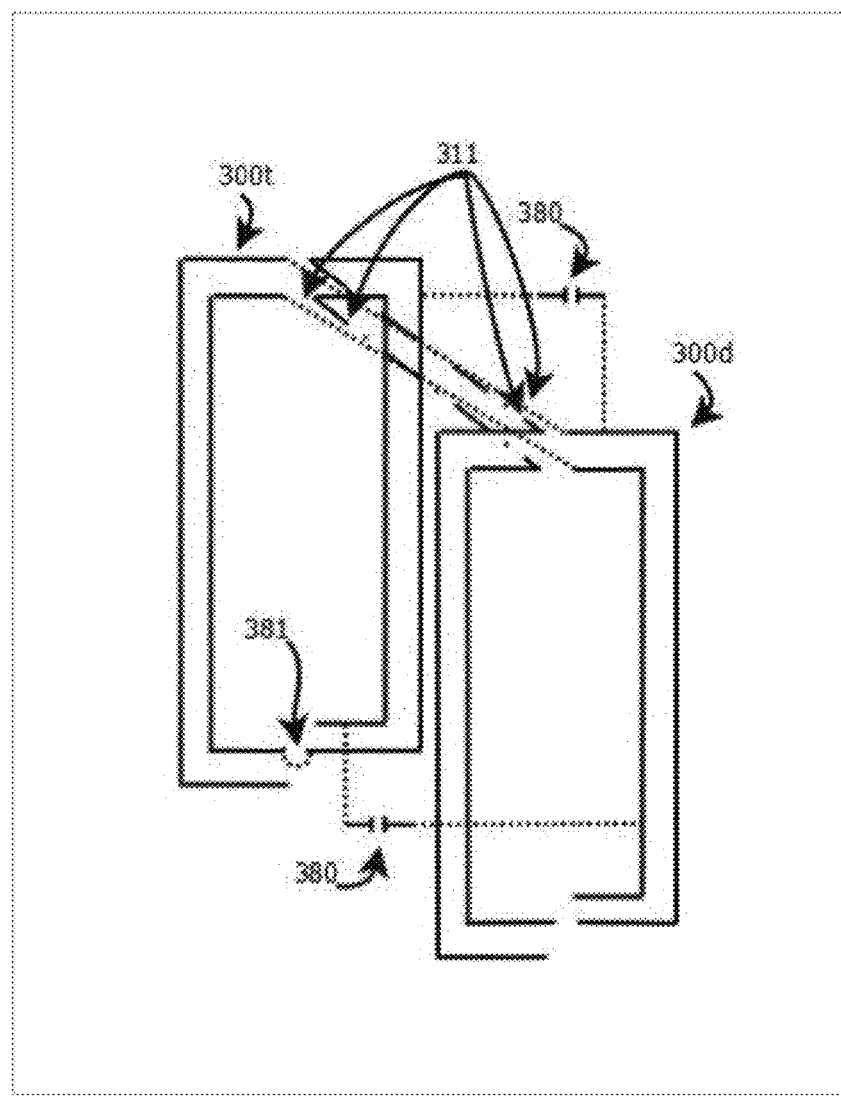
FIG. 9 illustrates the block diagram of the solution recommended by the above-mentioned patent application WO 2011157941

The tolerance range could be determined, as illustrated in FIG. 8d:
$f_{M3,min}$=13.550 MHz and $f_{M3,max}$=13.940 MHz, thus $\Delta_{M3}$=390 kHz This represents an increase of more than 40% of the tolerance band.

In addition, in this embodiment (M3), the antenna area is 63 cm², compared with 132 cm² of the solution described in the aforementioned patent applications WO2011157941 and US 2009/0027208, yielding a detection distance increased by 20 cms (180 cm instead of 160 cm). In one embodiment that was described above, a reading distance of 144 cm was obtained with a surface of 19.6 cm². From an interpolation curve (calculated from various embodiments), it could be estimated that an area of 23.25 cm2 was necessary to reach a distance of 150 cm, ie 6 times less surface than the solution recommended in the aforementioned patent applications WO2011157941 and US 2009/0027208.

As can be seen, the invention therefore makes it possible to significantly increase the tolerance range of the tuning frequency, for a same difference in maximum reading distance. In addition, one obtains an increased energy efficiency, since less sensing surface is required compared to conventional tags for the same maximum detection distance. The antenna segments can also be grouped by two or more within a same conductive cable with two or more wires, in order to show a linear capacitance between each of the antenna segments of a value between 50 and 75 pF/m.

It will also be possible to provide a transponder comprising a printed circuit comprising a connector (281) allowing the connection of three antenna segments 701, 702, 703.

The transponder may include means of communication of the identity, as well as the characteristics of the buried work (date of burial, nature of the work, characteristics of the material, . . . ). It may be configured to allow the identification of a fluid distribution line (eg drinking water) or gas, electric cable protection or optical fiber cable.

It may be adapted to be arranged in an autonomous housing fixed to the tube by clipping, welding or clamping.

The invention claimed is:

1. A transponder for a RFID-type wireless communication and contactless identification system configured to be affixed to a structure intended to be buried, said transponder comprising:
   a set of antenna segments consisting of electrical wires constituting at least a first and a second antenna element (203-1, 203-2),
   a connector (281) comprising a RFID chip and at least one tuning capacitance (202*x*) as well as coupling means allowing the electrical coupling of said antenna segments, wherein the connector further includes:
      a first (284-1), second (284-2) and third input electrodes (284-3) for connecting a first end of a first (701), second (702) and third (703) antenna segments, respectively;
      a fourth (285-1), fifth (285-2) and sixth (285-3) output electrode for connecting a second end of said first (701), said second (702) and said third (703) antenna segment;
      a first circuit (286-3) for connecting the first input electrode (284-1) to the sixth output electrode (285-3) via an RFID chip;
      a second circuit (286-1) for connecting the second input electrode (284-2) to the fourth output electrode (285-1); and
      a third circuit (286-2) for connecting the third input electrode (284-3) to the fifth output electrode (285-2) via a capacitance (202*x*);
   wherein said antenna segments are arranged close to each other, at a distance of less than 3 mm and preferably less than 1 mm, so as to allow the appearance of coupling capacities capable of widening the band of tolerance on the RFID resonance frequency.

2. The transponder according to claim 1, characterized in that the antenna segments are arranged in a same plane, concentrically, and electrically connected to said connector (281), wherein two immediately adjacent antenna segments are arranged at a distance less than 3 mm, and preferably 1 mm, so as to allow the appearance of coupling capacitors capable of widening the tolerance band on the RFID resonance frequency.

3. The transponder according to claim 1, characterized in that the antenna segments have planes superimposed on each other, in which two immediately adjacent antenna segments are situated at a distance of less than 3 mm and preferably less than 1 mm allowing the appearance of coupling capacitors capable of widening the tolerance band on the RFID resonance frequency.

4. The transponder according to claim 1 characterized in that the antenna segments are arranged in order to form a twist (282) allowing the appearance of coupling capabilities that can expand the tolerance band on the RFID resonance frequency.

5. The transponder according to claim 1 characterized in that said antenna segments are grouped by two or more within the same conductor cable with two or more conductors, in order to show a linear capacitance between each of the antenna segments between 50 and 75 pF/m.

6. The transponder according to claim 1, characterized in that said first, second and third antenna segments (701, 702, 703) are integrated within the same tri-wire cable making it possible to generate a capacitance distributed between said segments of antenna.

7. The transponder according to claim 1 one of the preceding claims, characterized in that it comprises means of communication of the identity, as well as the characteristics of the buried work (date of burial, nature of the work, material, etc.).

8. The transponder according to claim 1 one of the preceding claims, characterized in that it is configured to allow the identification of a fluid distribution line (e.g., drinking water) or gas, electrical cable protection or fiber cable optical.

9. The transponder according to claim 1 one of the preceding claims, characterized in that it is adapted to be arranged in an autonomous housing fixed to the tube by clipping, welding or clamping.

10. A transponder for a RFID-type wireless communication and contactless identification system configured to be affixed to a structure intended to be buried, said transponder comprising:
    a set of antenna segments consisting of electrical wires constituting at least a first and a second antenna element (203-1, 203-2),
    a connector (281) comprising a RFID chip and at least one tuning capacitance (202*x*) as well as coupling means allowing the electrical coupling of six antenna segments (801-806), the connector further includes:
       a first (284-1), a second (284-2), a third (284-3), a fourth (284-4), a fifth (284-5) and a sixth input electrode (284-6) for connecting a first end of a first (801), a second (802), a third (803), a fourth (804), a fifth (805)) and a sixth (806) antenna segment, respectively;
       a seventh (285-1), an eighth (285-2), a ninth (285-3), a tenth (285-4), an eleventh (285-5) and a twelfth (285-6) electrode of an output for connecting a second end of said first (801), second (802), third (803), fourth (804), fifth (805) and sixth (806) antenna segments, respectively;
    wherein said integrated circuit comprises:
       a first circuit (286-7) for connecting the first input electrode (284-1) to the twelfth output electrode (285-6) via an RFID chip;
       a second circuit (286-1) for connecting the second input electrode (284-2) to the seventh output electrode (285-1);
       a third circuit (286-2) for connecting the third input electrode (284-3) to the eighth output electrode (285-2) via a capacitor (202*x*);
       a fourth circuit (286-3) for connecting the fourth input electrode (284-4) to the ninth output electrode (285-3);
       a fifth circuit (286-4) for connecting the fifth input electrode (284-5) to the tenth output electrode (285-4); and
       a sixth circuit (286-5) for connecting the sixth input electrode (284-6) to the eleventh output electrode (285-5);
          wherein said antenna segments are arranged close to each other, at a distance of less than 3 mm and preferably less than 1 mm, so as to allow the appearance of coupling capacities capable of widening the band of tolerance on the RFID resonance frequency.

11. The transponder according to claim 10, characterized in that said first, second and third antenna segments (801, 802, 803) are integrated within a first three-wire electrical cable and in that said fourth, fifth and sixth Antenna segments (804, 805, 806) are integrated within a second three-wire electrical cable.

* * * * *